US008520237B2

(12) United States Patent
Iwase

(10) Patent No.: US 8,520,237 B2
(45) Date of Patent: Aug. 27, 2013

(54) IMAGE FORMING APPARATUS WITH PRINT SERVER FUNCTION, PRINT SERVER ACTIVATING METHOD IN A NETWORK, AND COMPUTER PROGRAM PRODUCT

(75) Inventor: Kayoko Iwase, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 928 days.

(21) Appl. No.: 12/591,137

(22) Filed: Nov. 10, 2009

(65) Prior Publication Data
US 2010/0118334 A1 May 13, 2010

(30) Foreign Application Priority Data
Nov. 11, 2008 (JP) .................. 2008-289168

(51) Int. Cl.
*G06F 3/12* (2006.01)
(52) U.S. Cl.
USPC .......................... 358/1.15; 358/1.14
(58) Field of Classification Search
None
See application file for complete search history.

(56) References Cited

U.S. PATENT DOCUMENTS

| 6,256,750 | B1 | 7/2001 | Takeda | |
|---|---|---|---|---|
| 2004/0252331 | A1* | 12/2004 | Wei | 358/1.15 |
| 2005/0289116 | A1* | 12/2005 | Chae et al. | 707/2 |
| 2007/0247664 | A1* | 10/2007 | Yamamoto | 358/1.16 |
| 2007/0247669 | A1 | 10/2007 | Iwai et al. | |
| 2008/0005331 | A1* | 1/2008 | Shiraishi | 709/226 |

FOREIGN PATENT DOCUMENTS

| JP | 07-219729 | 8/1995 |
|---|---|---|
| JP | 10-240470 A | 9/1998 |
| JP | 2000001007 A | 1/2000 |
| JP | 2000-181653 | 6/2000 |
| JP | 2007-295288 | 11/2007 |

* cited by examiner

*Primary Examiner* — Marivelisse Santiago Cordero
*Assistant Examiner* — Kent Yip
(74) *Attorney, Agent, or Firm* — Edwards Wildman Palmer LLP; David G. Conlin; David A. Tucker

(57) ABSTRACT

In a network environment having a plurality of image forming apparatuses connected thereto, an image forming apparatus that can reduce down time related to printing without increasing burden on system construction is provided. An image forming apparatus includes a communication unit communicating with other apparatuses through the network, an image forming unit connected to the communication unit through a bus, a print instruction management unit connected to the communication unit through the bus and capable of transmitting a print request, received through the communication unit, to designated one of the image forming apparatuses connected to the network, and a server setting unit determining, by a prescribed procedure, which of the apparatuses having the print server function connected to the network, to be the print server. The print instruction management unit enables or disables the function of the print instruction management unit mentioned above, in accordance with the determination by the server setting unit.

17 Claims, 12 Drawing Sheets

IMAGE FORMING APPARATUS WITH PRINT SERVER FUNCTION, PRINT SERVER ACTIVATING METHOD IN A NETWORK, AND COMPUTER PROGRAM PRODUCT

CROSS-REFERENCE TO RELATED APPLICATION

This nonprovisional application claims priority under 35 U.S.C. §119(a) on Patent Application No. 2008-289168 filed in Japan on Nov. 11, 2008, the entire contents of which are hereby incorporated by reference.

BACKGROUND OF THE INVENTION

1. Field of the Invention

The present invention relates to an image forming apparatus and, more specifically, to an image forming apparatus having a print server function for managing image data held by other apparatuses connected to a network.

2. Description of the Background Art

Recently, a network system including a terminal such as a PC (Personal Computer) and an image forming apparatus such as a printer, a printer-copier, or an MFP (Multifunction Peripheral) communicable with such a terminal through a network has come to be widely used.

In such a network system, the terminal outputs to the image forming apparatus a print instruction for instructing printing of print data such as an image. Upon receiving the print instruction, the image forming apparatus prints the print data on a sheet of paper in accordance with the print instruction.

In a conventionally well-known network system including an image forming apparatus, it is possible for a user to designate an image forming apparatus as a destination, when he/she operates the terminal to output the print instruction. By doing so, it becomes possible for the user to have the printing process done by the desired image forming apparatus and to confirm the resulting print.

Japanese Patent Laying-Open No. 2000-181653 (hereinafter referred to as "'653 application") discloses a technique related to the network system including image forming apparatuses. The network system described in '653 application includes, in addition to the image forming apparatuses such as a printer and the terminal, a server that provides a service of automatically determining a destination of print output.

In the network system described in '653 application, a user of the terminal does not designate any image forming apparatus as the destination of print instruction. The terminal transmits the print instruction to the server. Receiving the print instruction, the server determines to which image forming apparatus the print instruction should be transmitted, and transmits the print instruction to the determined image forming apparatus. Receiving the print instruction, the image forming apparatus executes the printing process.

Though hardware reliability has been much improved recently, there is always a risk of server operation failure. In the system described in '653 application, printing as described above is impossible without a server and, in addition, if the server should fail, any process related to printing becomes impossible in the system as a whole. In consideration of such a situation, the system described in '653 application includes two or more servers as prerequisite, and according to the disclosure, if one server should fail, another server is determined to be a substitute.

According to the technique described in '653 application, however, the system requires at least one dedicated print server. Without such a server, the system cannot realize the printing function. Further, at least one additional apparatus must be present, to serve as a substitute print server. Preparation of a substitute print server is disadvantageous in view of cost. Therefore, construction of a system such as described in '653 application including a plurality of image forming apparatuses with reduced burden on system construction has been desired.

At present, an image forming apparatus having a function of storing printed images to allow filing by the user has come to be popular. Generally, such a filing process involves an operation of displaying file names stored in the apparatus on an operation panel and selecting a desired file therefrom. If there is a plurality of image forming apparatuses each having the filing function in a network system, it follows that different images are stored in different image forming apparatuses. If a user wishes to print a certain image data, he/she must first search for the image forming apparatus that stores the image data.

The prior art including the technique described in '653 application cannot solve such a problem.

SUMMARY OF THE INVENTION

Therefore, it is desirable to provide an image forming apparatus that can reduce down time related to printing without increasing burden on system construction, in a network environment having connected thereto a plurality of image forming apparatuses.

It is more desirable to provide an image forming apparatus that allows the user to easily find a desired print file and that can reduce down time related to printing without increasing burden on system construction, in a network environment having connected thereto a plurality of image forming apparatuses.

It is more desirable to provide an image forming apparatus that allows highly efficient printing of image data managed by each of the image forming apparatuses and that can reduce down time related to printing without increasing burden on system construction, in a network environment having connected thereto a plurality of image forming apparatuses.

According to a first aspect, the present invention provides an image forming apparatus with print server function, including: a communication device connected to a network; an image forming unit connected to the communication device; a print server module connected to the communication device, for transmitting a print request received through the communication device to a designated one of image forming apparatuses connected to the network; a print server determining unit determining, in a predetermined procedure, which of apparatuses having the print server function connected to the network is to be used as a print server; and a server enabling unit, connected to receive an output of the print server determining unit, for enabling or disabling the print server module in accordance with the determination by the print server determining unit.

Assume that a plurality of image forming apparatuses are connected to the network to which the above-described image forming apparatus is connected. In that case, when each user issues a print instruction to the image forming apparatus functioning as the print server, it is possible to cause a desired image forming apparatus to print, through the said image forming apparatus, though there is no dedicated print server. It is unnecessary to search for a certain image forming apparatus on the network. If the print server should fail to operate by some cause or other, some other image forming apparatus automatically determines an image forming apparatus that newly functions as a print server. If the image forming apparatus in accordance with the present invention is determined to be the print server, the print server module is enabled, and the image forming apparatus can be used as the print server from a terminal or the like on the network. As a result, a situation in which printing becomes impossible in the whole system can be prevented.

Preferably, the image forming apparatus further includes a print data storage storing print data; a list obtaining module, connected to the communication device, for obtaining a list of print data stored in the image forming apparatuses on the network, while the image forming apparatus with print server function is functioning as the print server; a list storage, connected to receive an output of the list obtaining module, for storing list of print data obtained by the list obtaining module; a print data requesting unit, connected to the communication device and the list storage, responsive to a print request designating certain print data from another image forming apparatus through the communication device while the image forming apparatus with print server function is functioning as the print server, for requesting the image forming apparatus holding the designated print data for transmission of the print data, based on the list of print data stored in the list storage; and a transfer device, connected to the communication device, for transferring the print data returned in response to the request transmitted by the print data request unit, to the image forming apparatus that has transmitted the print request, while the image forming apparatus with print server function is functioning as the print server.

When the image forming apparatus functions as a print server, a list of print data stored in other image forming apparatus on the network is stored in the list storage. Receiving a print request corresponding to the print data from other image forming apparatus, the transfer device finds out in which image forming apparatus the print data is stored, based on the list, receives the data from the thus found image forming apparatus, and transfers the data to the image forming apparatus that has transmitted the print request.

Other image forming apparatuses can receive desired print data through the image forming apparatus functioning as the print server, while it is unnecessary for other image forming apparatuses to grasp which image data is stored in which image forming apparatus on the network. Further, what is necessary for the image forming apparatus functioning as the print server is to store not the image data but only the list having far smaller amount of data. Therefore, even if the image forming apparatus may possibly be used as a print server, it is unnecessary to provide a large capacity storage in the image forming apparatus.

More preferably, the list storage stores each print data in the list in association with an identifier of the image forming apparatus that stores the print data; and the print data requesting unit includes a request module, connected to the communication device and to the list storage, responsive to reception of the print request from other image forming apparatus through the communication device while the image forming apparatus with print server function is functioning as the print server, for requesting the image forming apparatus identified by the identifier stored in association with the designated print data for transmission of the print data, based on the list of print data stored in the list storage.

The image forming apparatus that stores the specific print data can be identified from the identifier stored in the list storage. It is unnecessary to newly issue an inquiry to each image forming apparatus to find an image forming apparatus that stores the specific print data, and the desired print data can be obtained in a short period of time.

The image forming apparatus with print server function may further include a list transmitting unit, connected to the communication device and to the list storage, responsive to reception of a request for a print data list from other image forming apparatus through the communication device while the image forming apparatus with print server function is functioning as the print server, for returning the list stored in the list storage to the image forming apparatus that has transmitted the list request.

When another image forming apparatus is to request the present image forming apparatus for transmission of specific print data, it is necessary to specify which print data is intended. Therefore, the list held by the present image forming apparatus is transmitted to the said another image forming apparatus, so that the list may be displayed on its monitor screen, allowing the user to easily find the desired print data. When transmission of the print data from the image forming apparatus functioning as the print server is requested, what is necessary is simply to return the information of the print data selected on the list. Therefore, design of other image forming apparatus or apparatuses can be made simple.

Preferably, the image forming apparatus with print server function further includes an updating module, connected to the communication device and to the list storage, responsive to reception of a notice of change of print data held by any of the image forming apparatuses on the network through the communication device while the image forming apparatus with print server function is functioning as the print server, for updating the list stored in the list storage in accordance with the notice of change.

When print data held by other image forming apparatus on the network is changed, a notice of change indicating the change is given to the updating module. The updating module updates the list stored in the list storage, based on the notice of change.

Any change made on the latest print data of other image forming apparatus on the network is reflected on the list held by the image forming apparatus functioning as the print server. Therefore, the image forming apparatus functioning as the print server always maintains the latest status of print data. As compared with an approach of issuing a status inquiry related to the print data from the print server to each image forming apparatus, process load on the print server can be reduced, and the print server can provide the service reflecting the latest status of print data on the network.

More preferably, the print server determining unit includes a priority storage storing priority as print server candidate, allocated in advance to an image forming apparatus having the print server function on the network, and a determination module, connected to the priority storage, for determining an image forming apparatus capable of operating as a print server and having the highest priority to be the print server, in accordance with the priority stored in the priority storage.

By manually having the priority of image forming apparatuses with print server function stored in the priority storage, it becomes possible, if the print server should fail by some cause or other, to automatically determine a print server in accordance with the priority. The priority is set in advance in a manner desirable for the user. Therefore, in accordance with the actual state of use of the image forming apparatus connected to the network, one having the highest performance, one that is the newest, one that requires shortest time for printing, or one having the largest storage capacity is determined to be the optimal print server satisfying conditions considered important by the user. As a result, it is possible to continue operation in a manner desired by the user, without stopping the printing service of the system as a whole.

More preferably, the print server determining unit includes an operation status obtaining unit, connected to the communication device, for obtaining operation status of each image forming apparatus having the print server function on the network, and a determination unit for determining, based on the operation status of each image forming apparatus obtained by the operation status obtaining unit, an image forming apparatus of which operation status satisfies prescribed conditions to be the print server.

The print server is determined in accordance with the operating status of each image forming apparatus. Since the image forming apparatus that functions as the print server is determined in accordance with the operation status, it is unnecessary for the user to determine the print server each time. The operating condition may differ day by day and hour by hour and, therefore, the function as a print server will not be concentrated to one specific image forming apparatus.

The operation status obtaining unit may include a use frequency information obtaining unit, connected to the communication device, for obtaining information related to frequency of use of an image forming apparatus having the print server function on the network; and the determination unit includes a module having an input connected to receive an output of the use frequency information obtaining unit, for determining an image forming apparatus of which frequency of use of an immediately preceding prescribed time period, obtained by the user frequency information obtaining unit, satisfies prescribed conditions to be the print server.

The print server is determined using the frequency of use of immediately preceding prescribed time period as the operation status. It is expected that the frequency of use in the past is different from that at present. Since an image forming apparatus to be the print server is determined using the frequency of use of the immediately preceding prescribed time period, it is possible to utilize an appropriate image forming apparatus considering the present situation as the print server.

According to a second aspect, the present invention provides, in a network having connected thereto a plurality of image forming apparatuses each capable of executing a print server function, a print server activating method of activating the print server function of any of the image forming apparatuses, including the steps of searching for an image forming apparatus having the print server function on the network; determining an image forming apparatus having the highest priority among image forming apparatuses searched out at the searching step to be the print server; requesting the image forming apparatus determined to be the print server at the determining step for activation of the print server function; and transmitting information specifying the image forming apparatus determined to be the print server to all the image forming apparatuses on the network.

According to a third aspect, the present invention provides a computer program product including a computer readable recording medium, wherein the recording medium records a computer program causing, when executed by a computer connected to an image forming apparatus and having a communication device connected to a network, the computer to operate as an image forming apparatus with print server function, the image forming apparatus including: a print server module, connected to the communication device, for transmitting a print request received through the communication device to designated one of image forming apparatuses connected to the network; a print server determining unit for determining, in a predetermined procedure, which of apparatuses having the print server function connected to the network is to be used as a print server; and a server enabling unit, connected to receive an output of the print server determining unit, for enabling or disabling the print server module in accordance with the determination by the print server determining unit.

As described above, according to the present invention, even when there is no dedicated print server, it is possible for the user to cause a desired image forming apparatus to execute printing, simply by issuing a print instruction to an image forming apparatus that functions as the print server. It is unnecessary to search for an image forming apparatus on the network, and such a print system can be realized simply by image forming apparatuses. Therefore, burden on constructing a network can be reduced. Even if the print server should fail by some cause or other, another image forming apparatus automatically determines an image forming apparatus to function as a print server, and the determined image forming apparatus automatically operates as the print server. As a result, the time period in which printing is impossible in the whole system can be made shorter, and failure of printing can substantially be avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
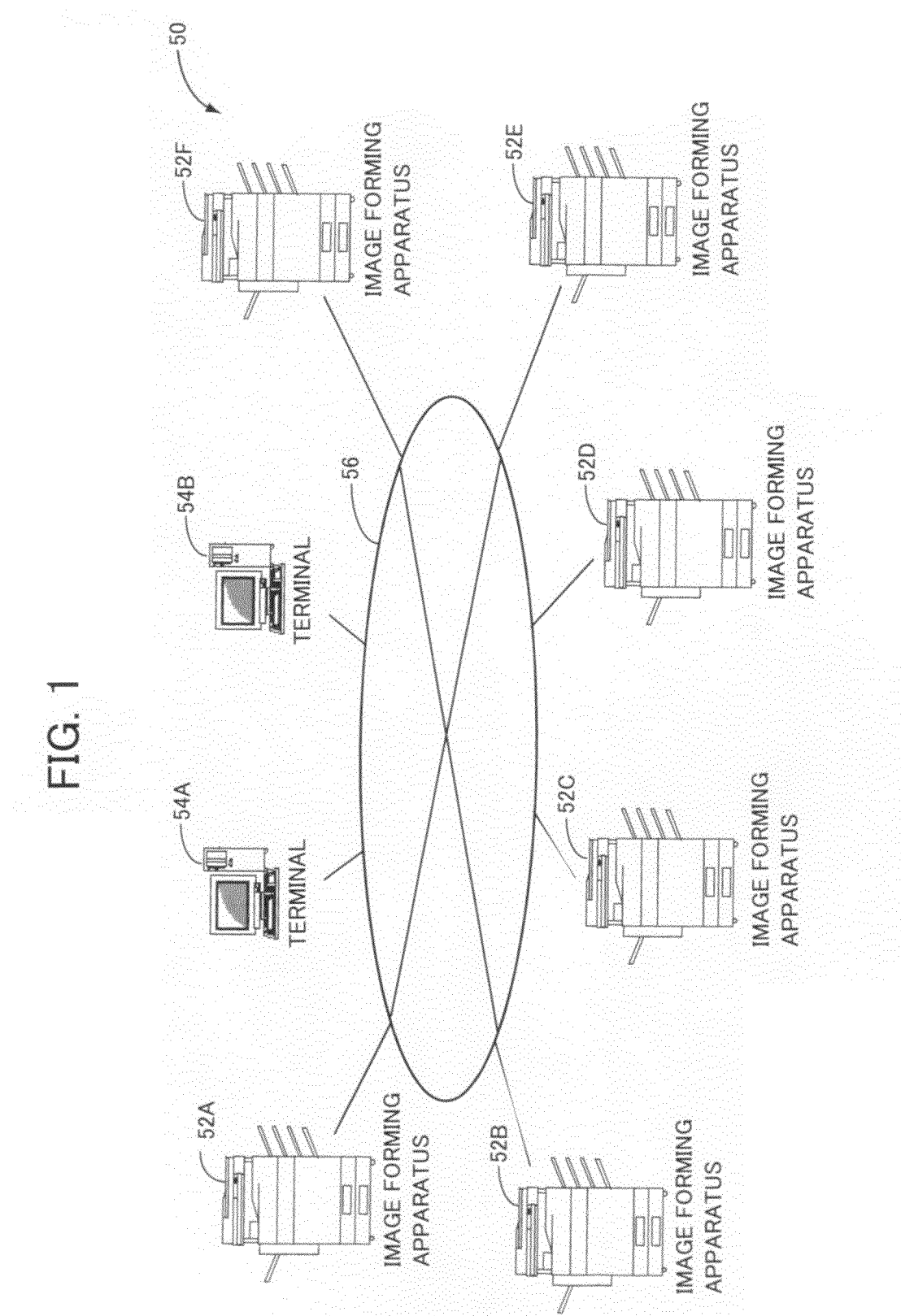
FIG. 1 is a schematic diagram showing an overall configuration of a print system 50 in accordance with an embodiment of the present invention.

In the following description and in the drawings, the same components are denoted by the same reference characters and same names. Their functions are also the same. Therefore, detailed description thereof will not be repeated.

Referring to FIG. 1, a print system 50 is connected to an LAN (Local Area Network) 56, and it includes image forming apparatuses 52A to 52F as electro-photographic MFPs each functioning as a facsimile, a copier and a printer, and terminals 54A and 54B such as PCs connected to image forming apparatuses 52A to 52F through LAN 56.

In the following, image forming apparatuses 52A to 52F may be simply referred to as an image forming apparatus 52.

Since image forming apparatus 52 in accordance with the present embodiment is an MFP, it may operate in a plurality of operational modes. Specifically, image forming apparatus 52 is operable in any of a printer mode in which an image received from terminal 54 or the like through LAN 56 is printed on a sheet of recording paper; a facsimile mode in which a document image is read by using a document reader and transmitted to another facsimile machine, or a document image is received from a facsimile transmission network and printed on a sheet of recording paper; a copy mode in which a document image is read by using a document reader and printed on a sheet of recording paper; a scan mode in which a document image is read by using a document reader and converted to electronic data; and a document filing mode in which electronic data of a plurality of images are subjected to filing process by a user.

Image forming apparatus 52 is capable of storing electronic data of a plurality of images. In the document filing mode, it is possible for the user to file image data stored in image forming apparatus 52. In the document filing mode, image forming apparatus 52 allows the user to select any of the image data stored therein, and the selected image data may be printed on a sheet of paper, transmitted via facsimile to an external facsimile machine, or transmitted via e-mail to an external apparatus.

Image forming apparatus 52 is capable of operating as a print server, as will be described later. In the following, an image forming apparatus 52 that is operating as a print server may be referred to as a "print server" while image forming apparatus 52 not operating as the print server may be referred to as a "common image forming apparatus."

When operating as the print server, image forming apparatus 52 realizes the following two functions. The first function of the print server is a "print instruction management function" for managing print instructions transmitted from terminals 54 and the like connected to LAN 56. The second function of the print server is a "filing data management function" for managing image data as the object of filing in each of the plurality of image forming apparatuses 52 connected to LAN 56. In the present embodiment, each apparatus connected to LAN 56 is capable of storing information as to which of the image forming apparatuses 52 is functioning as the print server, and terminal 54 and the like transmit all print instructions to the print server.

In the following, the print instruction management function and the filing data management function will be briefly described.

The print instruction management function is for transmitting a print instruction managed by the print server to an arbitrary common image forming apparatus and causing the common image forming apparatus to execute a process such as printing.

A common image forming apparatus may request the print server for a list of "information representing contents of print instruction" stored in the print server.

The information representing the contents of print instruction includes, for example, file name of the image data as the object of printing, an IP (Internet Protocol) address and host name of a terminal that is the transmission source of the print instruction, and date and time of transmission of the print instruction by the source terminal. Here, the information representing the contents of print instruction will be referred to as the print instruction information. Here, it is assumed that the print instruction includes the image data as the object of printing, and that the print instruction information does not include the image data.

When a common image forming apparatus transmits the "print instruction list request" requesting the list of print instruction information to the print server, the print server transmits the list of print instruction information to the image forming apparatus that is the transmission source of the request.

Receiving the list of print instruction information from the print server, the common image forming apparatus lets the user to select any of the pieces of print instruction information. When the user selects a certain piece of print instruction information, the common image forming apparatus transmits a print instruction request requesting the print instruction corresponding to the selected piece of print instruction information, to the print server. Receiving the print instruction request, the print server transmits the print instruction corresponding to the request, to the image forming apparatus that is the transmission source of the request. The common image forming apparatus executes the printing process in accordance with the print instruction transmitted from the print server.

Utilizing the filing data management function, the print server stores file names of image data filed in every image forming apparatus 52. Each file name is stored in association with an IP address of image forming apparatus 52 in which the file is stored. In the following, a list of the file name and the IP address stored in this manner in the print server will be referred to as a filing data list.

A common image forming apparatus is capable of transmitting a filing data list request, requesting the filing data list, to the print server. When a common image forming apparatus transmits the filing data list request to the print server, the print server transmits the filing data list to the image forming apparatus that is the transmission source of the request. Receiving the filing data list, the common image forming apparatus displays the list to the user, to allow the user to select any of the file names. The common image forming apparatus transmits a filing data request requesting the image data corresponding to the selected file name, to the print server. Receiving the filing data request, the print server obtains the image data from the image forming apparatus that stores the selected file, and transmits the obtained data to the image forming apparatus that is the transmission source of filing data request. Thus obtaining the image data, the common image forming apparatus may print the data, transmit the data via facsimile or transmit the data via e-mail, as instructed by the user.

Figure 2:
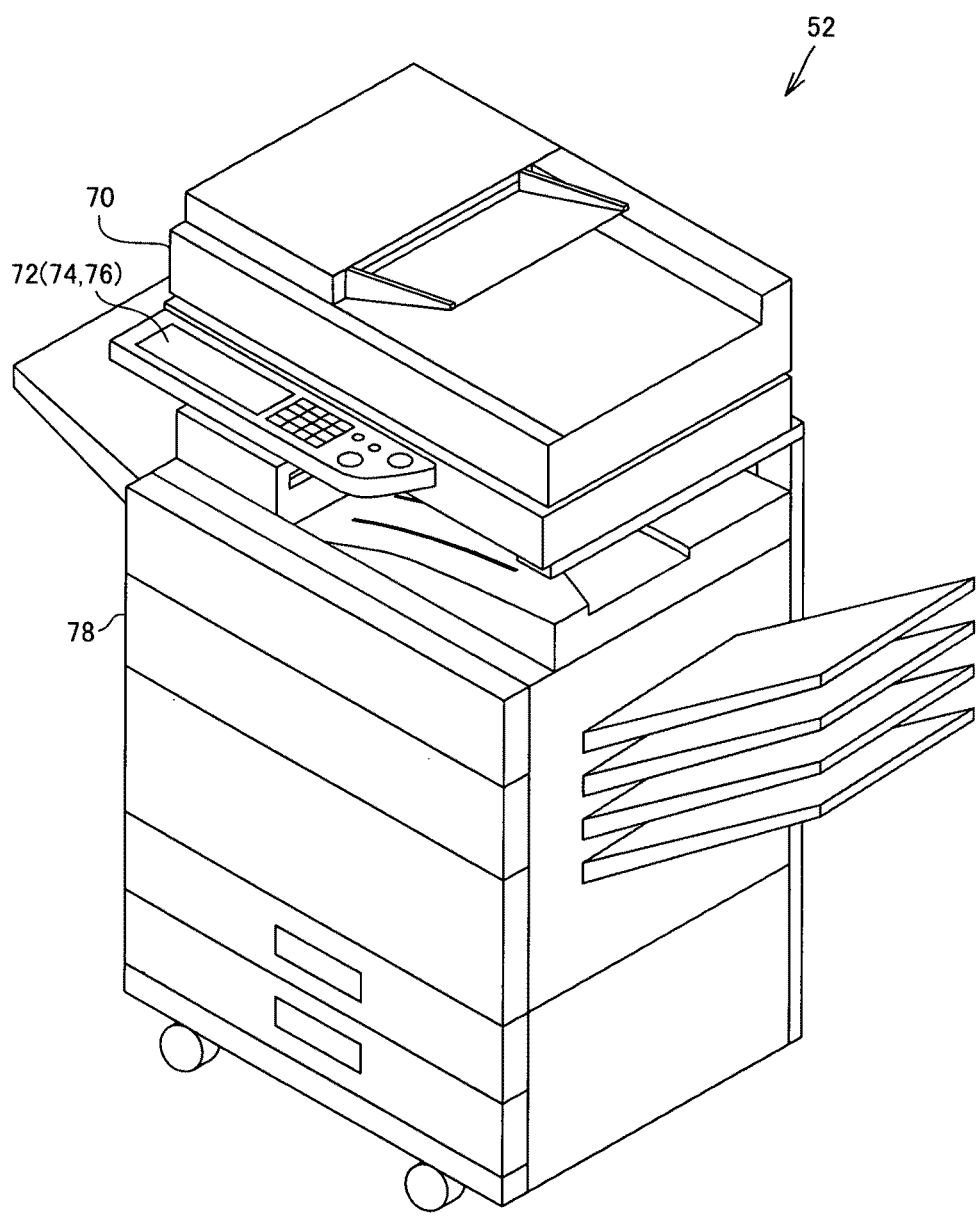
FIG. 2 is a perspective view showing an appearance of an image forming apparatus 52 shown in FIG. 1.
Figure 3:
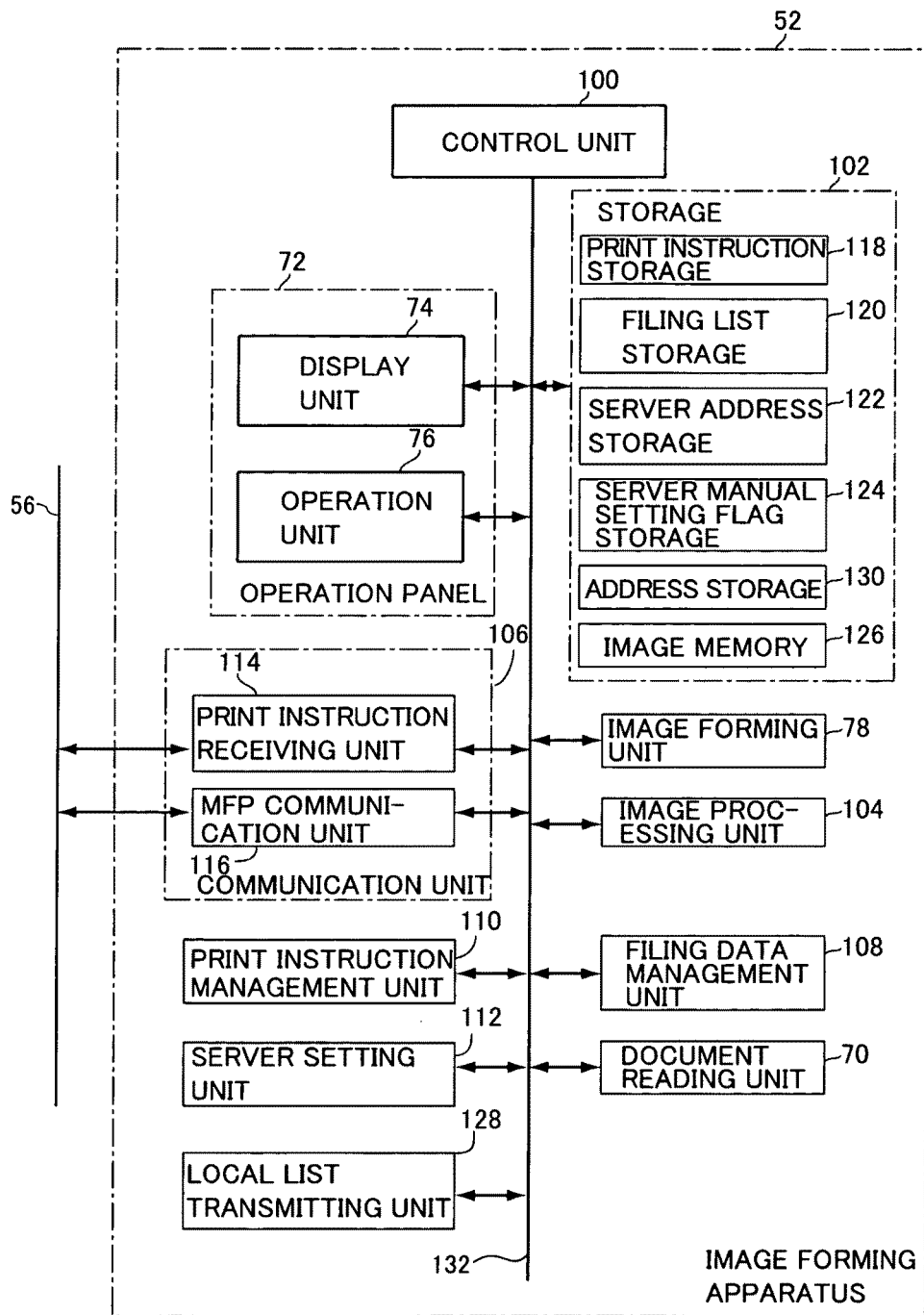
FIG. 3 is a block diagram showing an internal configuration of image forming apparatus 52 shown in FIG. 1.

Referring to FIGS. 2 and 3, image forming apparatus 52 includes: a document reading unit 70 for reading a document image and outputting RGB (R: Red, G: Green, B: Blue) analog signals; an image forming unit 78 provided below document reading unit 70, for forming an image on a sheet of recording paper; and an operation panel 72 used when the user operates image forming apparatus 52, including a display unit 74 and an operation unit 76, provided in front of document reading unit 70.

Referring to FIG. 3, image forming apparatus 52 further includes: an image processing unit 104 for converting the image signals read by document reading unit 70 to digital signals and outputting the same; a communication unit 106 connected to LAN 56, for realizing a function of performing communication with a terminal, other image forming apparatus or the like to print an image on a sheet of recording paper in accordance with a received print instruction, transmitting image data received from outside to another computer via e-mail and so on; and a storage unit 102 for storing various pieces of information including image data output by image processing unit 104, image data received via facsimile from an external apparatus, image data received through e-mail from an external apparatus, and various programs.

Image forming apparatus 52 further includes: a print instruction management unit 110 for realizing the print instruction management function, and a filing data management unit 108 for realizing the filing data management function, when image forming apparatus 52 operates as the print server. Image forming apparatus 52 further includes: a server setting unit 112 for executing a process for setting any of the image forming apparatuses 52 connected to LAN 56 to be a new print server; and a local list transmitting unit 128 for executing a process for transmitting a list of file names of image data stored in image memory 126 to the print server, when the image forming apparatus 52 is operating as a common image forming apparatus.

In the following, the list of file names transmitted by local list transmitting unit 128 will be referred to as a local filing data list.

Image forming apparatus 52 further includes a bus 132 connected to document reading unit 70, image forming unit 78, operation panel 72, image processing unit 104, communication unit 106, storage unit 102, print instruction management unit 110, filing data management unit 108, server setting unit 112 and local list transmitting unit 128; and a control unit 100 connected to bus 132 for realizing general functions of the image forming apparatus.

Control unit 100 is in charge of overall control of image forming apparatus 52. Document reading unit 70, image forming unit 78, operation panel 72, image processing unit 104, communication unit 106, storage unit 102, print instruction management unit 110, filing data management unit 108, server setting unit 112 and local list transmitting unit 128 are controlled by control unit 100.

When image forming apparatus 52 is operating as a common image forming apparatus, control unit 100 transmits, through communication unit 106, the "print instruction list request," "print instruction request," "filing data list request" and "filing data request" described above, to the print server.

Communication unit 106 includes: a print instruction receiving unit 114 for receiving a print instruction from terminal 54A and the like when image forming apparatus 52 is operating as the print server; and an MFP communication unit 116 for receiving the "print instruction list request," "print instruction request," "filing data list request" and "filing data request" from common image forming apparatuses when image forming apparatus 52 is operating as the print server.

Storage unit 102 includes: a print instruction storage unit 118 for storing a print instruction received by print instruction receiving unit 114; an image memory 126 for storing image data output from image processing unit 104, image data of print instruction received from terminal 54A and the like through communication unit 106 and so on; an address storage unit 130 for storing an IP address of image forming apparatus 52; a server manual setting flag storage unit 124 for storing a flag indicating whether the print server is to be automatically set by image forming apparatus 52 or manually set by the user, when server setting unit 112 sets a new print server; a filing list storage unit 120 for storing a latest filing data list when image forming apparatus 52 is operating as the print server; and a server address storage unit 122 for storing an IP address of the image forming apparatus operating as the print server, among the image forming apparatuses connected to LAN 56.

Storage unit 102 further includes an operation time storage unit, not shown, for accumulating and storing the operation time, every time operation panel 72 is operated by the user.

When the IP address stored in address storage unit 130 matches the IP address stored in server address storage unit 122, image forming apparatus 52 operates as the print server. If not, it operates as a common image forming apparatus. Image forming apparatus 52 continuously determines whether the IP addresses in server address storage unit 122 and in address storage unit 130 match. While the addresses match, image forming apparatus 52 operates as the print server, and while the IP addresses do not match, it operates as a common image forming apparatus.

In server manual setting flag storage unit 124, "0" or "1" is stored. If "0" is stored in server manual setting flag storage unit 124, server setting unit 112 executes a process for automatically setting the print server. If "1" is stored in server manual setting flag storage unit 124, server setting unit 112 executes a process for letting the user manually set the print server apparatus. Though not shown, the value to be stored in server manual setting flag storage unit 124 may be changed by the user through an operation on operation panel 72.

Figure 4:
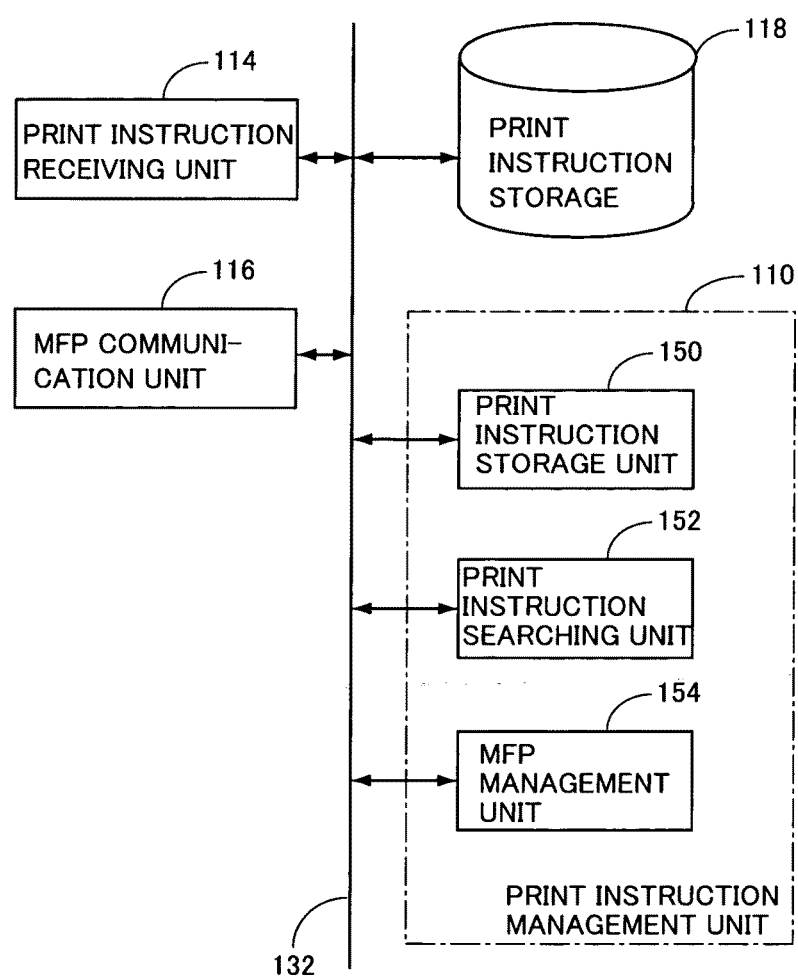
FIG. 4 is a functional block diagram of a print instruction management unit 110 shown in FIG. 3.

Referring to FIG. 4, print instruction management unit 110 includes: a print instruction storage control unit 150, responsive to reception of a print instruction by print instruction receiving unit 114 from terminal 54A or the like, for storing the print instruction in print instruction storage unit 118; a print instruction searching unit 152 for finding, when MFP communication unit 116 receives a print instruction request from a common image forming apparatus, whether or not a print instruction corresponding to the request exists in print instruction storage unit 118, and if it exists, transmitting the print instruction to the image forming apparatus that sent the request, through MFP communication unit 116; and an MFP management unit 154 for transmitting, when MFP communication unit 116 received a print instruction list request from a common image forming apparatus, all pieces of print instruction information stored in print instruction storage unit 118 to the image forming apparatus that transmitted the request.

Figure 5:
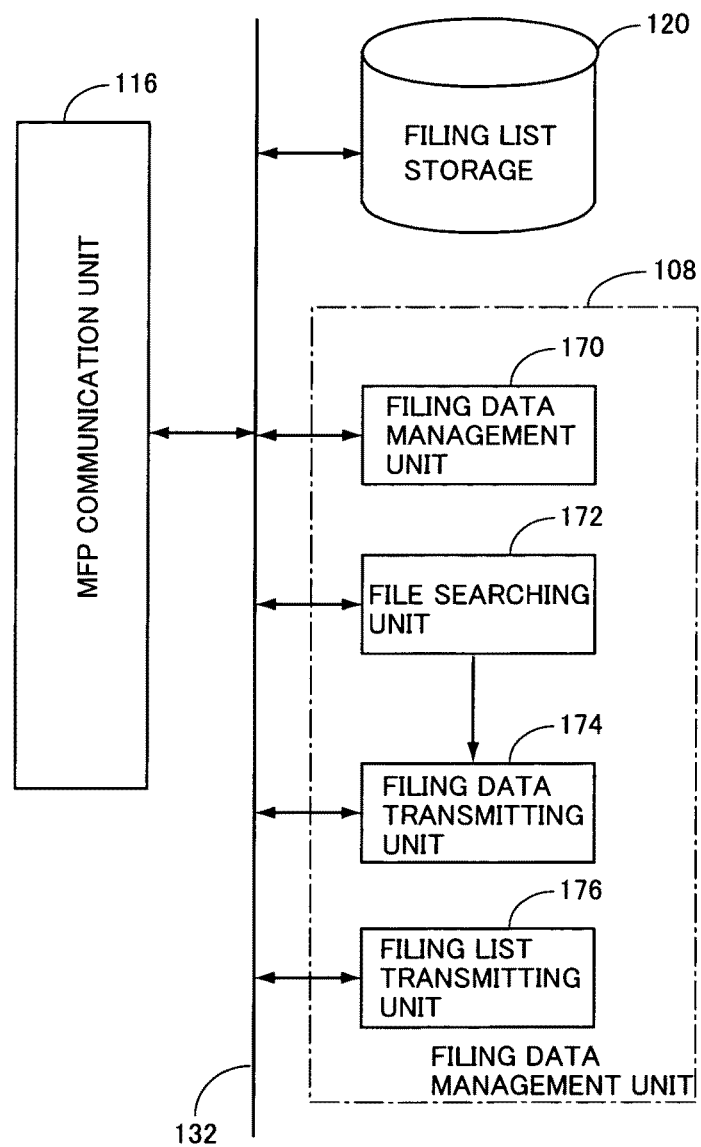
FIG. 5 is a functional block diagram of a filing data management unit 108 shown in FIG. 3.

Referring to FIG. 5, filing data management unit 108 includes: a filing list receiving unit 170 for updating, when MFP communication unit 116 received a local filing data list from a common image forming apparatus, filing list storage unit 120 in accordance with the list; a file searching unit 172 for finding, when MFP communication unit 116 received a filing data request from a common image forming apparatus, whether or not any common image forming apparatus holds the image data that corresponds to the filing data request; a filing data transmitting unit 174 for obtaining, when a common image forming apparatus holding the image data is found as a result of search by file searching unit 172, the image data from the common image forming apparatus, and transmitting the image data to the image forming apparatus as the transmission source of the filing data request; and a filing list transmitting unit 176 for transmitting, when MFP communication unit 116 received a filing data list request from a common image forming apparatus, the filing data list stored in filing list storage unit 120 to the image forming apparatus that transmitted the request.

Figure 6:
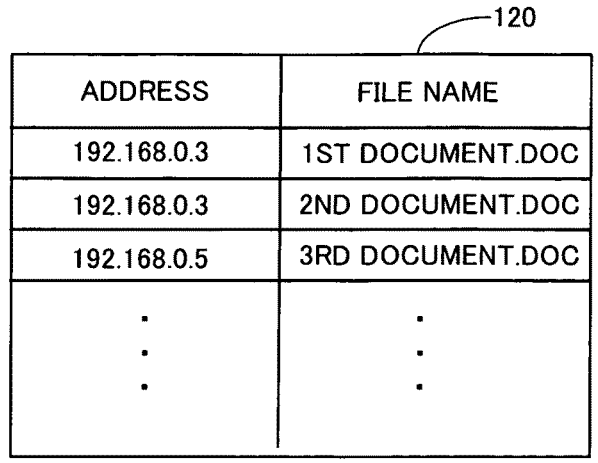
FIG. 6 shows a configuration of a filing list storage unit 120 shown in FIG. 3.

Referring to FIG. 6, filing list storage unit 120 stores, for each file name of image data stored in image forming apparatus connected to LAN 56, an IP address of the image forming apparatus that stores the file.

[Software Configuration]

Figure 7:
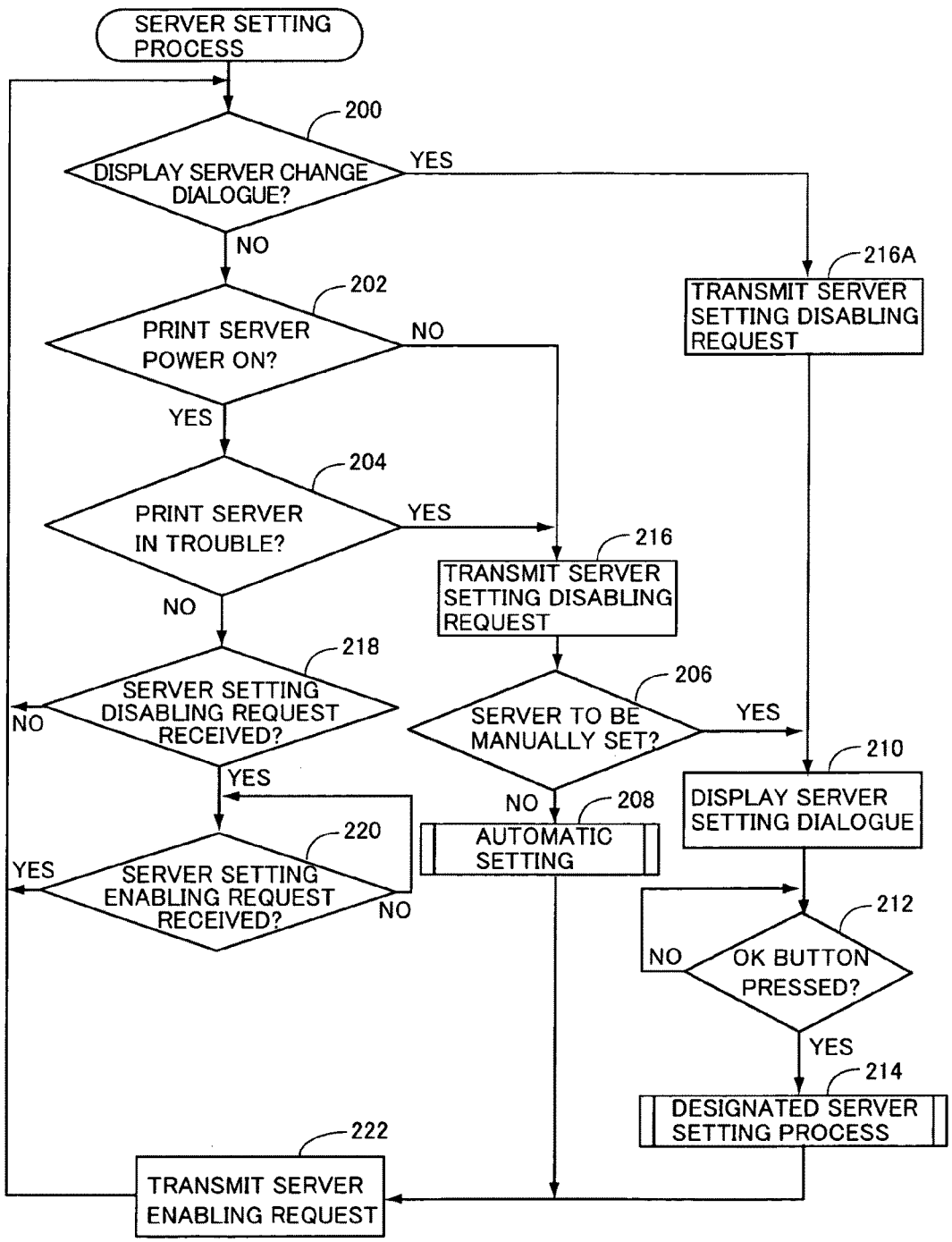
FIG. 7 is a flowchart representing a control structure of a program executed by a server setting unit 112 shown in FIG. 3.

In the following description, a "server changing dialogue" refers to a dialogue for changing the image forming apparatus that operates as the print server. Referring to FIG. 7, a program executed by server setting unit 112 when image forming apparatus 52 is activated includes: a step 200 of determining whether or not display of the server changing dialogue on operation panel 72 has been requested, and branching control flow depending on the result of determination; a step 202 of determining, if it is not requested to display the server changing dialogue at step 200, whether or not the power of print server is ON, and branching control flow depending on the result of determination; and a step 204 of determining, if it is determined at step 202 that the power of print server is ON, whether or not a failure has occurred in the print server, and branching control flow depending on the result of determination.

Figure 14:
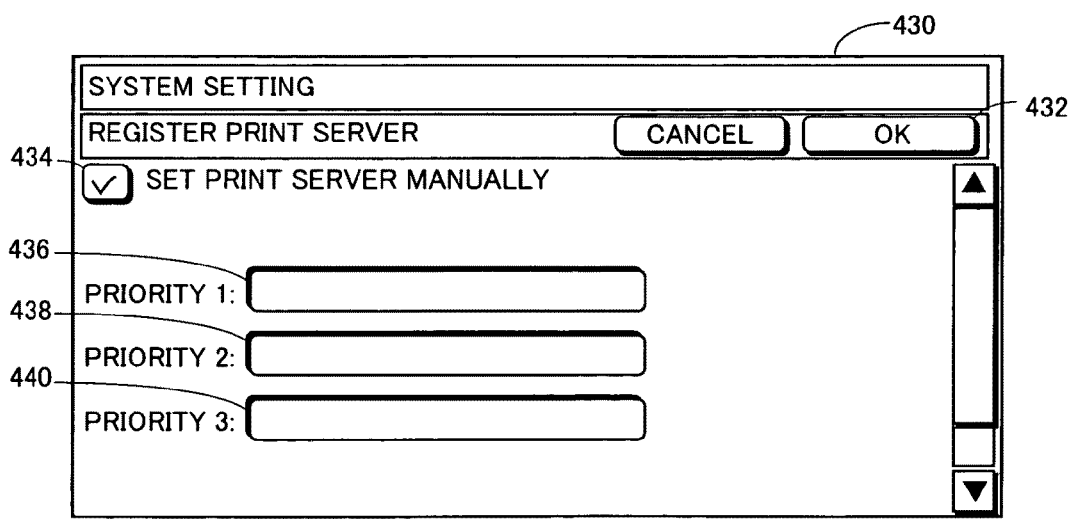
FIG. 14 shows an image displayed on an operation panel 72 at step 210 shown in FIG. 7.

Referring to FIG. 14, at step 200, on a server changing dialogue 430, a check box 434 operated to designate whether or not the print server is to be manually set by the user, text boxes 436 to 440 for inputting IP addresses of image forming apparatuses the user wishes to set as the print server, in accordance with the priority, and an OK button 432 for establishing the contents input to check box 434 and text boxes 436 to 440, are displayed.

If check box 434 is ON, server setting unit 112 newly sets the print server in accordance with the contents input to text boxes 436 to 440. If check box 434 is OFF, server setting unit 112 automatically sets the print server.

At step 204, the failure that occurs in the print server includes, for example, a malfunction of an HDD (Hard Disk Drive) of the print server and a full-spool state.

Again referring to FIG. 7, the program includes; a step 216, executed if it is determined at step 202 that the power of print server is off, or if it is determined at step 204 that a failure occurred in the print server (YES), of transmitting, to all other image forming apparatuses 52, a server setting disabling request requesting disabling of server setting unit 112 of these image forming apparatuses 52; a step 206, following step 216, of determining whether or not "1" is stored in server manual setting flag storage unit 124, and branching control flow depending of the result of determination; a step 208 of executing, if it is determined at step 206 that "1" is not stored in server manual setting flag storage unit 124, the automatic setting process for automatically setting the print server; and a step 222, following step 208, of transmitting, to all other image forming apparatuses 52, a server setting enabling request requesting enabling of their server setting unit 112, and returning control to step 200.

The program further includes: a step 216A of transmitting, when an operation of displaying server changing dialogue 430 at step 200, the above-described server setting disabling request to all other image forming apparatuses 52; a step 210, executed if it is determined at step 206 that "1" is stored in server manual setting flag storage unit 124, or executed after step 216A, of displaying server changing dialogue 430 on operation panel 72; a step 212, following step 210, of waiting until OK button 432 is pressed; and a step 214 of executing, when OK button 432 is pressed, a designated server setting process of setting the print server in accordance with contents input through server setting dialogue 430 and proceeding to step 222.

The program further includes a step 218, executed if it is determined at step 204 that no failure has occurred in the print server (NO), of determining whether or not the server setting disabling request has been received from any other image forming apparatus 52, and branching control flow depending on the result of determination; and a step 220 of waiting, if the server setting disabling request has been received at step 218, for reception of a server setting enabling request from other image forming apparatus 52, and after reception, returning the control to step 200. If the server setting disabling request is not received at step 218, the control returns to step 200.

Figure 8:
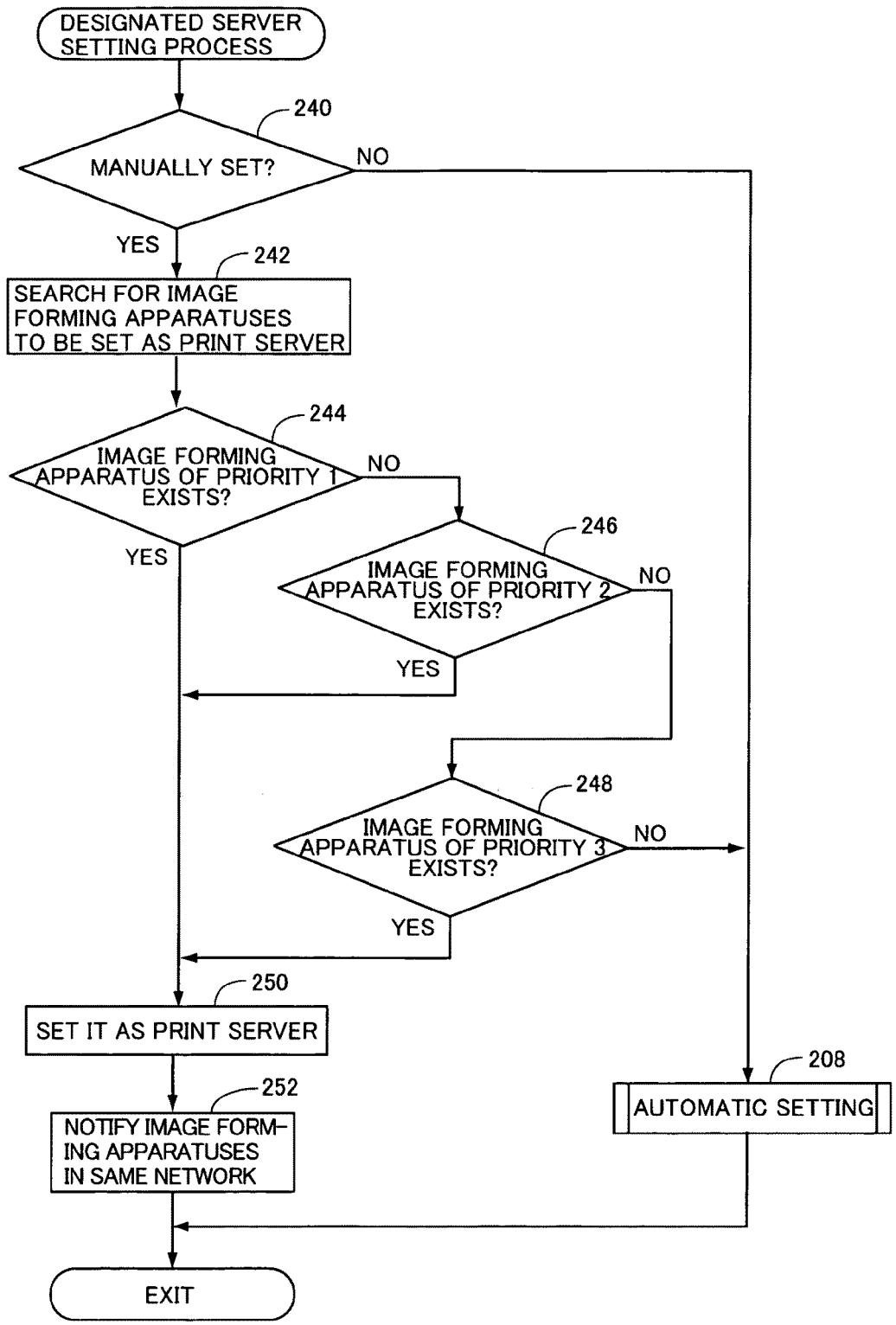
FIG. 8 is a detailed flow of a step 214 shown in FIG. 7.

Referring to FIG. 8, the routine realizing step 214 of FIG. 7 includes: a step 240 of determining, on server changing dialogue 430, whether or not check box 434 is ON, and branching control flow depending on the result of determination; and a step 208, executed if it is determined at step 240 that check box 434 is ON, of performing the automatic setting process and ending the routine.

The routine further includes: a step 242 of finding, if it is determined that check box 434 is ON at step 240, whether or not the image forming apparatuses designated by text boxes 436 to 440 are connected to LAN 56; a step 244, following step 242, of determining whether or not an image forming apparatus having the IP address of highest priority input to text box 436 is connected to LAN 56, and branching control flow depending on the result of determination; a step 246 of determining, if it is determined at step 244 that the image forming apparatus of highest priority is not connected to LAN 56, whether or not an image forming apparatus having the IP address of second highest priority is connected to LAN 56, and branching control flow depending on the result of determination; and a step 248 of determining, if it is determined at step 246 that the image forming apparatus having the IP address of second highest priority is not connected to LAN 56, whether or not an image forming apparatus having an IP address of third highest priority is connected to LAN 56, and branching control flow depending on the result of determination. If it is determined at step 248 that the image forming apparatus having the third highest priority is not connected to LAN 56, the control proceeds to step 208.

The routine further include a step 250, executed if it is determined at step 244 that the image forming apparatus of highest priority is connected to LAN 56, if it is determined at step 246 that the image forming apparatus of second highest priority is connected to LAN 56, or if it is determined at step 248 that the image forming apparatus of third highest priority is connected to LAN 56, of storing the IP address of the image forming apparatus of high priority in each case, in server address storage unit 122; and a step 252, following step 250, of notifying the IP address to the terminals and image forming apparatuses connected to LAN 56 and ending this routine.

Though not shown, other image forming apparatuses 52 that received the notice at step 252 store the IP address in server address storage unit 122. The same applies to terminal 54 and the like. After receiving the notice, when a print instruction is to be output, terminal 54A or the like outputs the instruction to the image forming apparatus that has been newly set as the print server.

Figure 9:
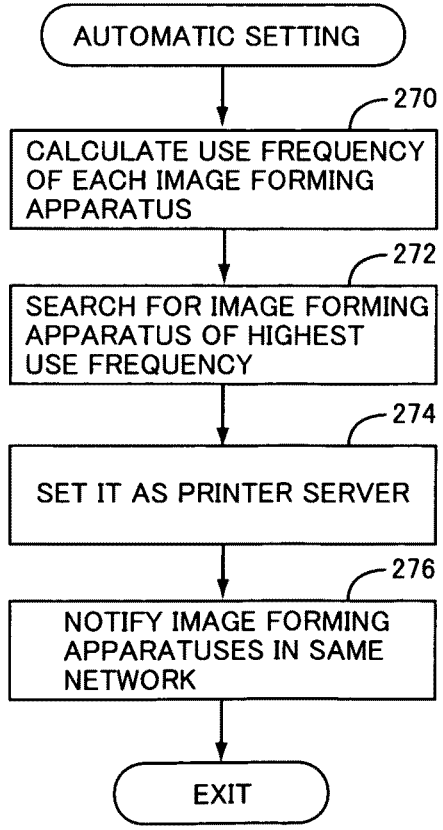
FIG. 9 is a detailed flow of a step 208 shown in FIGS. 7 and 8.

Referring to FIG. 9, the routine realizing step 208 shown in FIGS. 7 and 8 includes: a step 270 of obtaining, from image forming apparatuses connected to LAN 56, operation time stored in the operation time storage unit of each image forming apparatus; a step 272, following step 270, of finding an image forming apparatus of which frequency of use is the highest in a predetermined time period going back from the present to the past; a step 274, following step 272, of storing the IP address of the image forming apparatus of which frequency of use is the highest, in server address storage unit 122; and a step 276, following step 274, of notifying the IP address to the terminal and image forming apparatus or apparatuses connected to LAN 56 and ending the routine.

Figure 10:
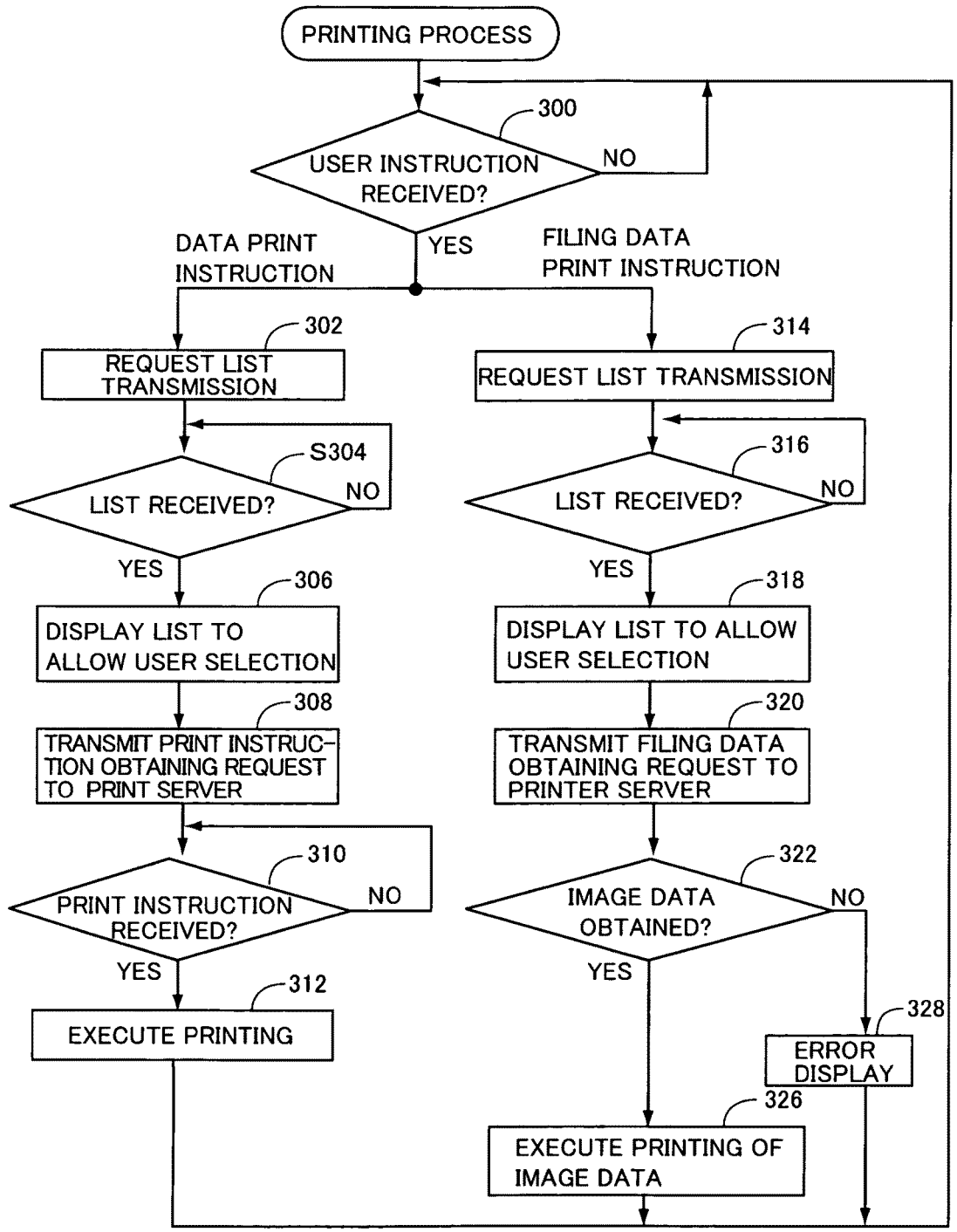
FIG. 10 is a flowchart representing a control structure of a program executed by a control unit 100 shown in FIG. 3.

Referring to FIG. 10, a program executed by control unit 100 when image forming apparatus 52 is switched from the print server to a common image forming apparatus includes: a step 300 of waiting until a user instruction to obtain a print instruction from print server or to obtain image data held by other image forming apparatus through the print server is received; a step 302 of transmitting, when an instruction to obtain a print instruction from the print server is received at step 300, a print instruction list request to the print server; a step 304, following step 302, of waiting until a list of print instruction information is received from the print server; and a step 306 of displaying, when the list of print instruction information is received at step 304, the list on operation panel 72, allowing the user to select any of the displayed pieces of print instruction information.

The program further includes: a step 308, following step 306, of transmitting a print instruction request including the selected print instruction information, to the print server; a step 310, following step 308, of waiting until the print instruction corresponding to the request is received from the print server; and a step 312 of executing, if the print instruction is received at step 310, a printing process in accordance with the print instruction, and returning the control to step 300.

The program further includes: a step 314 of transmitting, if an instruction to obtain image data held by other image forming apparatus is received from the print server, a filing data list request to the print server; a step 316, following step 314, of waiting until the filing data list is received from the print server; and a step 318 of displaying, if the filing data list is received at step 316, the list on operation panel 72, allowing the user to select any of the displayed file names.

The program further includes: a step 320, following step 318, of transmitting a filing data request including the selected file name and the IP address associated with the file name to the print server; a step 322, following step 320, of determining whether or not the image data corresponding to the file name has been received from the print server, and branching control flow depending on the result of determination; and a step 326 of executing, if it is determined at step 322 that the image data has been received, a process of printing the image data on a sheet of paper, and returning the control to step 300.

The program further includes: a step 328 of displaying, if a signal indicating that transmission of image data is impossible is received from the print server at step 322, a message indicating absence of the file on operation panel 72 and returning the control to step 300.

Figure 11:
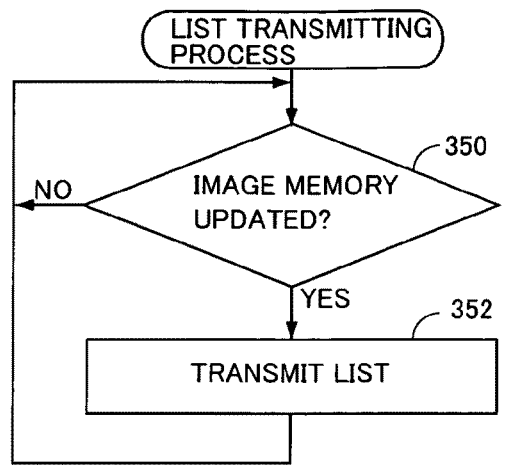
FIG. 11 is a flowchart representing a control structure of a program executed by a local list transmitting unit 128 shown in FIG. 3.

Referring to FIG. 11, a program executed by a local list transmitting unit 128 when image forming apparatus 52 is switched from the print server to a common image forming apparatus includes: a step 350 of waiting until image memory 126 is updated or server address storage unit 122 is updated; and a step 352 of transmitting, if image memory 126 is updated or server address storage unit 122 is updated, a local filing data list to the print server and returning control to step 350.

By way of example, updating of image memory 126 involves addition of new image data to image memory 126, and editing or deleting by the user of image data that has been stored in image memory 126.

Figure 12:
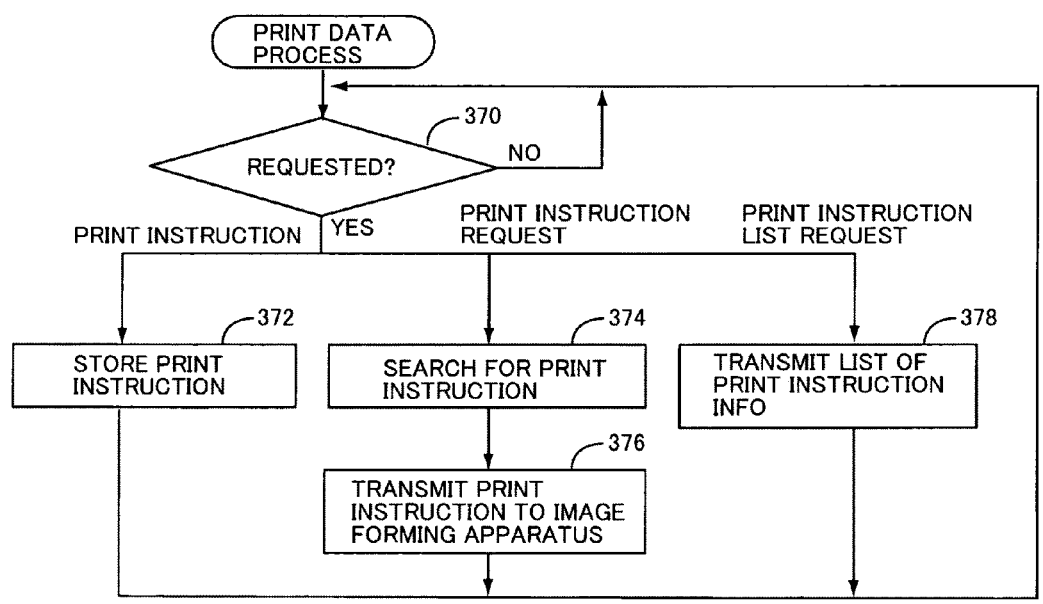
FIG. 12 is a flowchart representing a control structure of a program executed by a print instruction management unit 110 shown in FIG. 3.

Referring to FIG. 12, a program executed by print instruction management unit 110 when image forming apparatus 52 is switched from the common image forming apparatus to the print server includes: a step 370 of waiting until any of a print instruction output from a terminal, a print instruction request output from a common image forming apparatus and a print instruction list request is received; and a step 372 of storing, when the print instruction is received, the print instruction in print instruction storage unit 118 and returning the control to step 370.

The program further includes: a step 374 of searching, if the print instruction request is received at step 370, for a print instruction corresponding to the received request in print instruction storage unit 118; and a step 376, following step 374, of transmitting, if the print instruction is present, the print instruction to the common image forming apparatus and returning the control to step 370.

The program further includes a step 378 of transmitting, if the print instruction list request is received at step 370, the list of print instruction information to the common image forming apparatus and returning the control to step 370.

When image forming apparatus 52 is switched from the print server to a common image forming apparatus, execution of the program described above by print instruction management unit 110 is stopped.

Figure 13:
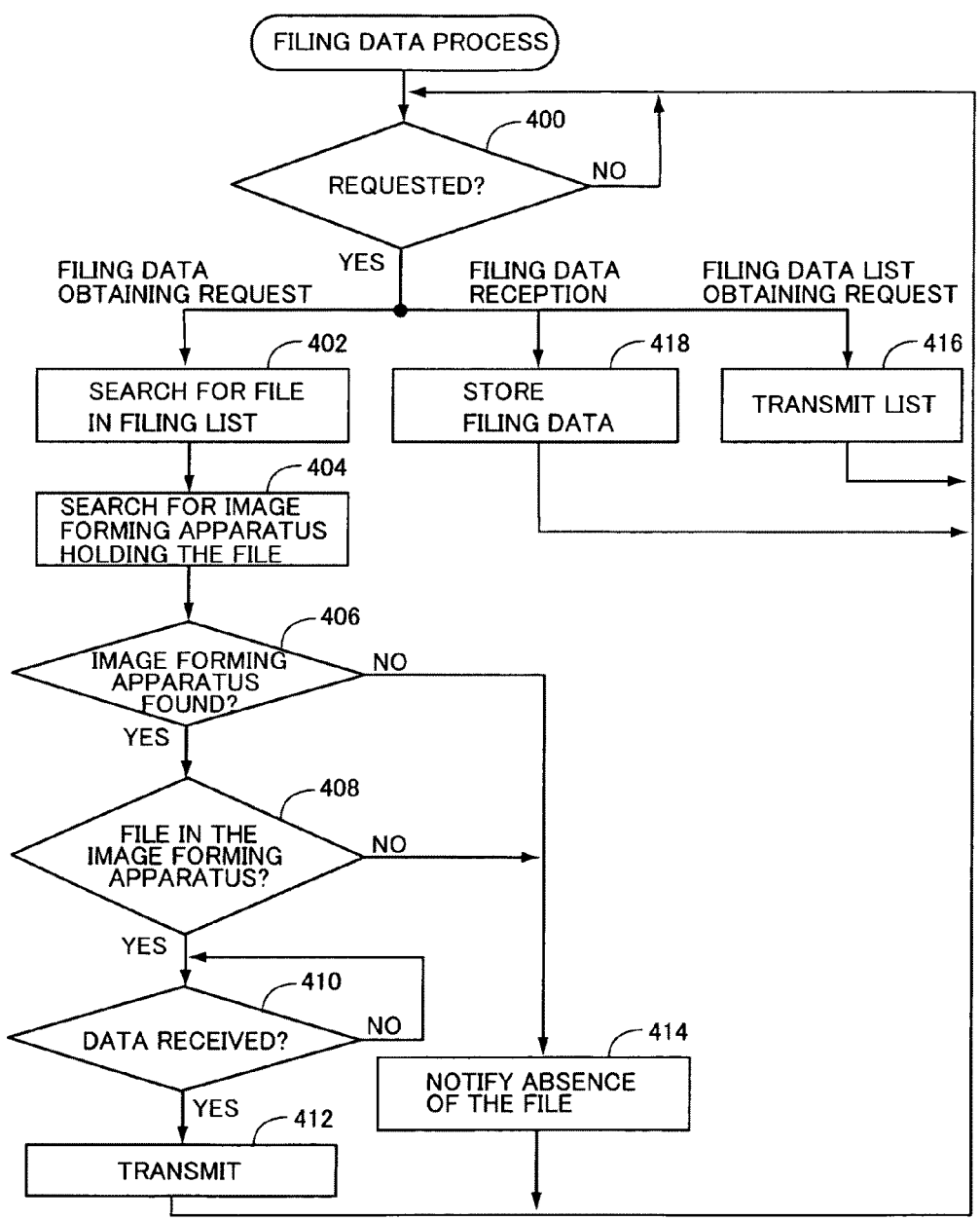
FIG. 13 is a flowchart representing a control structure of a program executed by filing data management unit 108 shown in FIG. 3.

Referring to FIG. 13, a program executed by filing data management unit 108 when image forming apparatus 52 is switched from a common image forming apparatus to the print server includes: a step 400 of waiting until any of the local filing data list, the filing data list request and the filing data request is received from a common image forming apparatus; a step 418 of updating, when the local filing data list is received at step 400, filing list storage unit 120 in accordance with the local filing data list and returning the control to step 400; and a step 416 of transmitting, when the filing data list request is received at step 400, the filing data list to the common image forming apparatus and returning the control to step 400.

The program further includes: a step 402 of searching, when the filing data request is received at step 400, for a file name included in the request from filing list storage unit 120; a step 404, following step 402, of finding whether or not the image forming apparatus having the IP address corresponding to the file name searched out at step 402 is connected to LAN 56; a step 406 of determining, from the result of search at step 404, whether or not the image forming apparatus is connected to LAN 56, and branching control flow depending on the result of determination; and a step 408 of determining, if it is determined at step 406 that the image forming apparatus is connected to LAN 56, whether or not the image data corresponding to the file name exists in the image forming apparatus, and branching control flow depending on the result of determination.

The program further includes: a step 414, executed if it is determined at step 406 that the image forming apparatus is not connected to LAN 56, or if the image data does not exist in the image forming apparatus at step 408, of transmitting a signal indicating that transmission of image data is impossible, to the image forming apparatus as the transmission source of the request received at step 400, and returning the control to step 400; a step 410 of waiting, if it is determined at step 408 that the image data exists in the image forming apparatus, until the image data is received from the image forming apparatus; and a step 412 of transmitting, when the image data is received at step 410, the image data to the image forming apparatus as the transmission source of the request received at step 400, and returning the control to step 400.

If image forming apparatus 52 is switched from the print server to a common image forming apparatus, the process of the above-described program executed by filing data management unit 108 is stopped.

[Operation]

Referring to FIGS. 1 to 14, print system 50 in accordance with the present embodiment having the configuration as described above operates in the following manner.

Assume that image forming apparatus 52B operates as the print server, and other image forming apparatuses 52 operate as common image forming apparatuses. Specifically, in server address storage unit 122 of every image forming apparatus 52, the IP address of image forming apparatus 52B is stored.

Local list transmitting unit 128 of the common image forming apparatus is activated, and it waits until image memory 126 is updated or the print server is changed (step 350 shown in FIG. 11).

Control unit 100 of the common image forming apparatus is executing the program realizing general functions of the image forming apparatus, and at the same time, it is executing the program having the control structure shown in FIG. 10. Control unit 100 of the common image forming apparatus waits until a user instruction is received (step 300 shown in FIG. 10).

In image forming apparatus 52B (the current print server), print instruction management unit 110 and filing data management unit 108 are activated. Print instruction management unit 110 of image forming apparatus 52B waits until any of the print instruction, print instruction list request and print instruction request is received (step 370 shown in FIG. 12). Filing data management unit 108 of image forming apparatus 52B waits until any of the local filing data list, filing data list request and filing data request is received from a common image forming apparatus (step 400 shown in FIG. 13).

(1) Operation when Printing is to be Done in Accordance with Print Instruction

Assume that a user causes terminal 54A to issue a print instruction. Terminal 54A transmits the print instruction to image forming apparatus 52B as the current print server.

Receiving the print instruction (YES at step 370 shown in FIG. 12), image forming apparatus 52B additionally stores the print instruction in print instruction storage unit 118 (step 372 shown in FIG. 12).

Thereafter, assume that the user moves from terminal 54A to image forming apparatus 52A.

Assume that the user gives an instruction to obtain the print instruction from the print server, by operating operation panel 72 of image forming apparatus 52A. In response to the instruction, image forming apparatus 52A transmits the print instruction list request to image forming apparatus 52B (step 302 shown in FIG. 10), and waits until the list of print instruction information is received from image forming apparatus 52B (step 304 shown in FIG. 10).

Receiving the print instruction list request from image forming apparatus 52A, image forming apparatus 52B returns the list of print instruction information (step 378 of FIG. 12).

Receiving the list of print instruction information from image forming apparatus 52B, image forming apparatus 52A displays the list on operation panel 72, allowing the user to select any of the pieces of display print instruction information (step 306 shown in FIG. 10). Here, the user may select the print instruction information transmitted from terminal 54A, or he/she may select other print instruction information. Image forming apparatus 52A transmits the print instruction request including the print instruction information selected by the user to image forming apparatus 52B (step 308 shown in FIG. 10), and waits until a print instruction is received from image forming apparatus 52B (step 310 shown in FIG. 10).

Receiving the print instruction request from image forming apparatus 52A, image forming apparatus 52B searches for the corresponding print instruction in print instruction storage unit 118 (step 374 shown in FIG. 12), and transmits the print instruction to image forming apparatus 52A (step 376 shown in FIG. 12).

Receiving the print instruction from image forming apparatus 52B, image forming apparatus 52A executes the printing process in accordance with the print instruction (step 312 shown in FIG. 10).

(2) Operation when Filing Data is Printed

Assume that the user uses image forming apparatus 52A in the document filing mode, and he/she has added, edited or deleted image data. Confirming that image memory 126 has been updated (YES at step 350 shown in FIG. 11), image forming apparatus 52A transmits a local filing data list to image forming apparatus 52B (current print server) (step 352 shown in FIG. 11).

Receiving the local filing data list transmitted from image forming apparatus 52B (YES at step 400 shown in FIG. 13), image forming apparatus 52B updates filing list storage unit 120 in accordance with the local filing data list (step 418 shown in FIG. 13).

Assume that a user operates operation panel 72 of image forming apparatus 52C, giving an instruction to obtain image data held in another image forming apparatus through the print server. Receiving the instruction, image forming apparatus 52C transmits a filing data list request to image forming apparatus 52B (step 314 shown in FIG. 10), and waits until the filing data list is received from image forming apparatus 52B (step 316 shown in FIG. 10).

Receiving the filing data list request, image forming apparatus 52B returns the filing data list (step 416 of FIG. 13).

Receiving the filing data list, image forming apparatus 52C displays the list on operation panel 72, allowing the user to select any of the displayed file names (step 318 shown in FIG. 10). Image forming apparatus 52C transmits a filing data request to image forming apparatus 52B (step 320 shown in FIG. 10), and waits until the image data is received from image forming apparatus 52B (step 322 shown in FIG. 10).

Receiving the filing data request from image forming apparatus 52C, image forming apparatus 52B searches for the file name included in the request in filing list storage unit 120 (step 402 shown in FIG. 13). When the file name is found, image forming apparatus 52B finds whether or not the image forming apparatus holding the file is connected to LAN 56 (step 404 shown in FIG. 13).

In the following, description of the operation after step 404 will be given assuming that the image forming apparatus holding the image data is connected to LAN 56 (YES at step 406 shown in FIG. 13) and that the image data exists in the image forming apparatus (YES at step 408 shown in FIG. 13). Here, it is assumed that image forming apparatus 52D holds the image data of interest.

Image forming apparatus 52B transmits an image data request requesting transmission of the image data, to image forming apparatus 52D and waits until the image data is received from image forming apparatus 52D (step 410 shown in FIG. 13).

Receiving the request, image forming apparatus 52D transmits the image data to image forming apparatus 52B.

Receiving the image data from image forming apparatus 52D, image forming apparatus 52B transmits the image data to image forming apparatus 52C (step 412 shown in FIG. 13).

Receiving the image data from image forming apparatus 52B, image forming apparatus 52C executes a process for printing the image data (step 326 shown in FIG. 10).

In the following, an operation following step 404 will be described, assuming that the image forming apparatus holding the image data is not connected to LAN 56 (NO at step 406 shown in FIG. 13) or that though the image forming apparatus is connected to LAN 56, the image forming apparatus is not holding the image data (YES at step 408 shown in FIG. 13 and NO at step 408).

Here, image forming apparatus 52B transmits a signal indicating that transmission of the image data is impossible, to image forming apparatus 52C (step 414 shown in FIG. 13).

Receiving the signal, image forming apparatus 52C displays a message indicating absence of the file on operation panel 72 (step 328 shown in FIG. 10). The user, viewing the message, will know that printing of the file is impossible.

(3) When Print Server Fails

In the following, the system operation when the print server fails will be described. Assume that, at present, image forming apparatus 52B is set as the print server.

It is assumed that, prior to this situation, "0" (automatic server setting) is stored in server manual setting flag storage unit 124 of image forming apparatus 52A.

Server setting unit 112 of every image forming apparatus 52 waits until there is a user operation to display server changing dialogue 430 on operation panel 72, the power of print server is turned off, the print server fails, or a server setting disabling request is received from any other image forming apparatus (steps 200 to 204 and 218 shown in FIG. 7).

Assume that image forming apparatus 52B has failed. Among the image forming apparatuses 52 operating as common image forming apparatuses, it is assumed that image forming apparatus 52A first recognizes occurrence of failure in image forming apparatus 52B (YES at step 204 shown in FIG. 7). Image forming apparatus 52A transmits the server setting disabling request to other image forming apparatuses 52 (step 216 shown in FIG. 7).

Receiving the server setting disabling request from image forming apparatus 52A (YES at step 218 shown in FIG. 7), other image forming apparatuses 52 wait until the server setting enabling request is received (step 220 shown in FIG. 7). Specifically, other image forming apparatuses 52 do not perform any process until the server setting enabling request is received.

Image forming apparatus 52A obtains operation time stored in operation time storage unit of each image forming apparatus 52 (step 270 shown in FIG. 9). Image forming apparatus 52A searches for the image forming apparatus 52 of which latest frequency of use in the prescribed time period back to a certain time point from the present time is the highest (step 272 shown in FIG. 9), and sets the image forming apparatus of which frequency of use is the highest as the new print server (step 274 shown in FIG. 9). Image forming apparatus 52A notifies the IP address of the print server to all apparatuses connected to LAN 56 (step 276 shown in FIG. 9). Image forming apparatus 52A transmits the server setting enabling request to other image forming apparatuses 52 (step 222 shown in FIG. 7).

Receiving the IP address, the terminal connected to LAN 56 transmits, when it is to transmit a print instruction, the instruction to the IP address as the destination. Receiving the IP address, image forming apparatuses 52 other than image forming apparatus 52A store the IP address in server address storage unit 122. Thereafter, the new image forming apparatus operates as the print server. Receiving the server enabling request from image forming apparatus 52A, image forming apparatuses 52 other than image forming apparatus 52A return the control to step 200. The system operation when the power of print server is turned off is substantially the same.

(4) Manual Setting

When image forming apparatus 52A is manually set as the new print server, the system operates in the following manner.

Assume that a user operates operation panel 72 of image forming apparatus 52A to display server changing dialogue 430. Then, the result of determination at step 200 shown in FIG. 7 is YES.

Image forming apparatus 52A transmits the server setting disabling request to other image forming apparatuses 52 (step 216A shown in FIG. 7). Receiving the request, other image forming apparatuses 52 wait until the server setting enabling request is received. Image forming apparatus 52A displays server changing dialogue 430 on operation panel 72 (step 200 shown in FIG. 7). Image forming apparatus 52A waits until OK button 432 is pressed (step 212 shown in FIG. 7).

An operation when the user turns on check box 434, inputs the IP addresses of image forming apparatuses 52 in text boxes 436 to 440 and presses OK button 432 on server changing dialogue 430 will be described.

Confirming that check box 434 is on (YES at step 240 shown in FIG. 8), image forming apparatus 52A searches for the image forming apparatuses 52 having the IP addresses input to text boxes 436 to 440 in LAN 56 (step 242 shown in FIG. 8).

If the image forming apparatus 52 having the highest priority (corresponding to the IP address input to text box 436) is connected to LAN 56 (YES at step 244 shown in FIG. 8), or if the image forming apparatus 52 having the highest priority is not connected to LAN 56 and the image forming apparatus 52 having the second highest priority is connected to LAN 56 (YES at step 246 shown in FIG. 8), or if the image forming apparatuses 52 having the highest and second highest priorities are not connected to LAN 56 and the image forming apparatus having the third highest priority is connected to LAN 56 (YES at step 248 shown in FIG. 8), image forming apparatus 52A determines the image forming apparatus 52 having the highest priority in each situation as the new print server (step 250 shown in FIG. 8). Image forming apparatus 52A stores the IP address of this image forming apparatus 52 in server address storage unit 122. Further, image forming apparatus 52A notifies other apparatuses connected to LAN 56 of the IP address (step 252 shown in FIG. 8). Image forming apparatus 52A transmits the server setting enabling request to other image forming apparatuses 52.

If the user turns OFF check box 434 and presses OK button 432, the result of determination at step 240 becomes NO. Image forming apparatus 52A performs the process for automatically setting the new print server as described above (step 214 shown in FIG. 7), and transmits the server setting enabling request to other image forming apparatuses 52.

[Effects of the Present Embodiment]

As is apparent from the foregoing description, use of print system 50 in accordance with the present invention provides the following effects.

When a certain image forming apparatus 52 operates as the print server, the print server stores a print instruction from a terminal. A common image forming apparatus transmits a print instruction request to the print server, receives a print instruction corresponding to the print instruction request, and executes the printing process. Therefore, it is possible for the user to select, after transmitting the print request from the terminal, an image forming apparatus that is convenient for the user and to cause the apparatus to execute the printing process.

If the image data as the object of printing is a confidential document, it is possible for the user to cause an image forming apparatus that is installed at a place closed to unauthorized people to print the confidential document. As a result, leakage of confidential document can be prevented.

Assume that a number of image forming apparatuses 52 are connected to LAN 56 and different image data are stored in each of the image forming apparatuses 52. A common image forming apparatus displays, in response to a user instruction, a list of image data file names stored in all image forming apparatuses 52, allowing the user to freely select a desired image data from the list. The common image forming apparatus obtains the image data corresponding to the selected file name from the print server, and executes a process such as printing, on the image data. Therefore, it is possible for the user to have the image data held by an image forming apparatus 52 placed at a different office printed while he/she stays in his/her own office. This eliminates the need to walk from office to office for checking which image data is stored in which image forming apparatus 52.

Filing list storage unit 120 of the print server stores not the image data but file names of image data stored in all image forming apparatuses. Therefore, filing list storage unit 120 need not be a large capacity storage such as required for storing huge amount of image data.

[Modification]

In the embodiment described above, at step 326 shown in FIG. 10, image forming apparatus 52 prints image data. The present invention, however, is not limited to such an embodiment, and the image data may be transmitted via facsimile to another facsimile machine, or it may be transmitted via e-mail to other apparatuses.

In the embodiment above, only the terminals 54A and 54B and image forming apparatuses 52 are connected to LAN 56. The present invention, however, is not limited to such an embodiment and, for example, an image forming apparatus not having the function for the print server may be connected to LAN 56.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus with a print server function, comprising:
   a communication device connected to a network;
   an image forming unit connected to said communication device;
   a print server module connected to said communication device, for transmitting a print request received through said communication device to a designated one of image forming apparatuses connected to said network;
   a stopping device stopping a process of newly setting a print server of any other apparatus with a print server function connected to said network;
   a print server determining unit determining, after said process of newly setting a print server is stopped by said stopping device in a predetermined procedure, which of apparatuses having a print server function connected to the network is to be used as a print server;
   a server enabling unit, connected to receive an output of said print server determining unit, for enabling or disabling said print server module in accordance with the determination by said print server determining unit;
   a notifying device notifying the apparatuses connected to said network of a result determined by said print server determining unit; and
   a resuming device resuming, after enablement or disablement of said print server module and after notification by said notification unit, the process of newly setting a print server of any other apparatus with a print server function connected to said network.

2. The image forming apparatus with print server function according to claim 1, further comprising:
   a print data storage storing print data;
   a list obtaining module, connected to said communication device, for obtaining a list of print data stored in the image forming apparatuses on said network, while said image forming apparatus with print server function is functioning as the print server;
   a list storage, connected to receive an output of said list obtaining module, for storing list of print data obtained by said list obtaining module;
   a print data requesting unit, connected to said communication device and said list storage, responsive to a print request designating certain print data from another image forming apparatus through said communication device while said image forming apparatus with print server function is functioning as said print server, for requesting the image forming apparatus holding the designated print data for transmission of said print data, based on the list of print data stored in said list storage; and
   a transfer device, connected to said communication device, for transferring the print data returned in response to the request transmitted by said print data request unit, to the image forming apparatus that has transmitted the print request, while said image forming apparatus with print server function is functioning as the print server.

3. The image forming apparatus with print server function according to claim 2, wherein
   said list storage stores each print data in said list in association with an identifier of the image forming apparatus that stores the print data; and
   said print data requesting unit includes a request module, connected to said communication device and said list storage, responsive to reception of said print request from other image forming apparatus through said communication device while said image forming apparatus with print server function is functioning as the print server, for requesting the image forming apparatus identified by the identifier stored in association with the designated print data for transmission of said print data, based on the list of print data stored in said list storage.

4. The image forming apparatus with print server function according to claim 3, further comprising:
   a list transmitting unit, connected to said communication device and to said list storage, responsive to reception of a request for a print data list from other image forming apparatus through said communication device while said image forming apparatus with print server function is functioning as said print server, for returning said list stored in said list storage to the image forming apparatus that has transmitted said list request.

5. The image forming apparatus with print server function according to claim 4, further comprising:
   an updating module, connected to said communication device and to said list storage, responsive to reception of a notice of a change of print data held by any of the image forming apparatuses on said network through said communication device while said image forming apparatus with print server function is functioning as said print server, for updating said list stored in said list storage in accordance with said notice of change.

6. The image forming apparatus with print server function according to claim 5, wherein:
said print server determining unit includes:
a priority storage storing priority as print server candidate, allocated in advance to an image forming apparatus having the print server function on said network, and
a determination module, connected to said priority storage, for determining an image forming apparatus capable of operating as a print server and having the highest priority to be the print server, in accordance with the priority stored in said priority storage.

7. The image forming apparatus with print server function according to claim 5, wherein:
said print server determining unit includes:
an operation status obtaining unit, connected to said communication device, for obtaining operation status of each image forming apparatus having the print server function on said network, and
a determination unit for determining, based on the operation status of each image forming apparatus obtained by said operation status obtaining unit, an image forming apparatus of which operation status satisfies prescribed conditions to be the print server.

8. The image forming apparatus with print serve function according to claim 7, wherein:
said operation status obtaining unit includes a use frequency information obtaining unit, connected to said communication device, for obtaining information related to frequency of use of an image forming apparatus having the print server function on said network; and
said determination unit includes a module having an input connected to receive an output of said use frequency obtaining unit, for determining an image forming apparatus of which frequency of use of an immediately preceding prescribed time period, obtained by said user frequency information obtaining unit, satisfies prescribed conditions to be the print server.

9. The image forming apparatus with print server function according to claim 2, further comprising:
a list transmitting unit, connected to said communication device and to said list storage, responsive to reception of a request for a print data list from other image forming apparatuses through said communication device while said image forming device with print server function is functioning as the print server, for returning said list stored in said list storage to the image forming apparatus that has transmitted said list request.

10. The image forming apparatus with print server function according to claim 2, further comprising:
an updating module, connected to said communication device and to said list storage, responsive to a notice of change of print data held by any of the image forming apparatuses on said network through said communication device while said image forming apparatus with print server function is functioning as said print server, for updating said list stored in said list storage in accordance with said notice of change.

11. The image forming apparatus with print server function according to claim 1, wherein:
said print server determining unit includes
a priority storage storing priority as print server candidate, allocated in advance to an image forming apparatus having the print server function on said network, and
a determination module, connected to said priority storage, for determining an image forming apparatus capable of operating as a print server and having the highest priority to be the print server, in accordance with the priority stored in said priority storage.

12. The image forming apparatus with print server function according to claim 1, wherein:
said print server determining unit includes an operation status obtaining unit, connected to said communication device, for obtaining operation status of each image forming apparatus having the print server function on said network, and
a determination unit for determining, based on the operation status of each image forming apparatus obtained by said operation status obtaining unit, an image forming apparatus of which operation status satisfies prescribed conditions to be the print server.

13. The image forming apparatus with print serve function according to claim 12, wherein:
said operation status obtaining unit includes a use frequency information obtaining unit, connected to said communication device, for obtaining information related to frequency of use of an image forming apparatus having the print server function on said network; and
said determination unit includes a module having an input connected to receive an output of said use frequency obtaining unit, for determining an image forming apparatus of which frequency of use of an immediately preceding prescribed time period, obtained by said user frequency information obtaining unit, satisfies prescribed conditions to be the print server.

14. In a network having connected thereto a plurality of image forming apparatuses each capable of executing a print server function, a print server activating method of activating the print server function of any of the image forming apparatuses, comprising the steps of:
stopping a process of newly setting a print server of any other apparatus with a print server function connected to said network;
after stopping the process of newly setting a printer server, searching for an image forming apparatus having the print server function on said network;
determining an image forming apparatus having the highest priority among the image forming apparatuses searched out at said searching step to be the print server;
requesting the image forming apparatus determined to be the print server at said determining step for activation of the print server function;
transmitting information specifying the image forming apparatus determined to be said print server to all the image forming apparatuses on said network; and
following said transmitting step, resuming the process of newly setting a print server of any other apparatus with a print server function connected to said network.

15. The print server activating method according to claim 14, wherein:
said determining step includes the step of determining an image forming apparatus, of which frequency of use in a prescribed time period is the highest among the image forming apparatuses searched out at said searching step, to be the print server.

16. The print server activating method according to claim 14, wherein:
said determining step includes the step of determining an image forming apparatus, of which latest frequency of use from the present back to a prescribed time period is the highest among the image forming apparatuses searched out at said searching step, to be the print server.

17. A computer program product embodied on a non-transitory computer readable recording medium, wherein:

said recording medium records a computer program causing, when executed by a computer connected to an image forming apparatus and having a communication device connected to a network, said computer to operate as an image forming apparatus with print server function, said image forming apparatus including:

print server means, connected to said communication device, for transmitting a print request received through said communication device to a designated one of image forming apparatuses connected to said network;

stopping means for stopping a process of newly setting a print server of any other apparatus with a print server function connected to said network, print server determining means for determining, after said process of newly setting a print server is stopped by said stopping means, in a predetermined procedure, which of apparatuses having the print server function connected to the network is to be used as a print server;

server enabling means, connected to receive an output of said print server determining means, for enabling or disabling said print server in accordance with the determination by said print server determination means;

notifying means for notifying the apparatuses connected to said network of a result determined by said print server determination means; and resuming means for resuming, after enablement or disablement of said print server module and after notification by said notifying means, the process of newly setting a print server of any other apparatus with the print server function connected to said network.

* * * * *